United States Patent
Raddatz et al.

(10) Patent No.: US 7,995,918 B2
(45) Date of Patent: Aug. 9, 2011

(54) POLARIZATION MODE DISPERSION MONITORING AND FAULT CORRELATION

(75) Inventors: Lutz Raddatz, Nürnberg (DE); David Stahl, Unterschleissheim (DE)

(73) Assignee: Alcatel Lucent, Paris (FR)

( * ) Notice: Subject to any disclaimer, the term of this patent is extended or adjusted under 35 U.S.C. 154(b) by 547 days.

(21) Appl. No.: 11/554,626

(22) Filed: Oct. 31, 2006

(65) Prior Publication Data

US 2008/0101799 A1    May 1, 2008

(51) Int. Cl.
*H04B 10/08* (2006.01)
*H04B 10/06* (2006.01)

(52) U.S. Cl. ............... 398/29; 398/27; 398/209

(58) Field of Classification Search ........ 398/25, 398/27–29, 208, 209
See application file for complete search history.

(56) References Cited

U.S. PATENT DOCUMENTS

| | | | |
|---|---|---|---|
| 5,930,414 A * | 7/1999 | Fishman et al. | 385/11 |
| 6,385,356 B1 * | 5/2002 | Jopson et al. | 385/11 |
| 6,396,606 B1 | 5/2002 | Mao | |
| 2002/0122220 A1 * | 9/2002 | Robinson et al. | 359/110 |
| 2003/0202798 A1 * | 10/2003 | Chou et al. | 398/159 |
| 2007/0053688 A1 * | 3/2007 | Benz et al. | 398/27 |

FOREIGN PATENT DOCUMENTS

WO    WO 2005/093975 A    10/2005

OTHER PUBLICATIONS

Polarization mode dispersion compensation by phase diversity detection; B.W. Hakki; Photonics Technology Letters, IEEE; vol. 9, Issue 1, Jan. 1997 pp. 121-123.*
International Search Report & Written Opinion corresponding PCT/US2007/022818, Apr. 17, 2008, Lucent Technologies Inc.

* cited by examiner

*Primary Examiner* — Nathan M Curs
(74) *Attorney, Agent, or Firm* — Wall & Tong, LLP

(57) ABSTRACT

A method and apparatus for a monitoring technique for the rate of change of polarization state and of the polarization mode dispersion is proposed. This technique is used for performance monitoring and fault correlation as well as for the verification of commitments to customers with respect to the transmission system's tolerance to polarization mode dispersion.

20 Claims, 4 Drawing Sheets

STATE TABLE

| STATE OF PMD (FEEDBACK SIGNAL) 310 | BIT ERROR RATE (MEASURED BY FEC-DECODER) 320 | CONCLUSION 330 |
|---|---|---|
| HIGH 312 | LOW 322 | NORMAL (GOOD) OPERATION 332 |
| HIGH 314 | HIGH 324 | TRANSMISSION PROBLEM, NOT RELATED TO PMD (i.e. EQUIPMENT PROBLEM, POWER TRANSIENT, ETC.) 334 |
| LOW (FOR LONGER PERIOD OF TIME) 316 | HIGH (FOR LONGER PERIOD OF TIME) 326 | TRANSMISSION PROBLEM, RELATED TO POLARIZATION EFFECTS (PMD VALUE TOO HIGH) 336 |
| SUDDEN DECREASE 318 | SUDDEN INCREASE 328 | TRANSMISSION PROBLEM, RELATED TO POLARIZATION EFFECTS (CHANGE IN POLARIZATION STATE OF SIGNAL TOO FAST) 338 |

POLARIZATION MODE DISPERSION MONITORING AND FAULT CORRELATION

FIELD OF INVENTION

The invention relates generally to the field of optical high-speed data transmission and, more specifically, polarization mode dispersion monitoring and fault correlation.

BACKGROUND OF INVENTION

Polarization mode dispersion (PMD) is an effect in fiber-optic systems which causes the transmission signals to spread in time, thereby causing signal degradation by intersymbol interference. The effect is essentially due to deviations from the ideal circular symmetry of the fiber, which may be caused by production imperfections or external influences. PMD may also be present in discreet optical components used in optical amplifiers. It is important to note that the state of polarization, as well as the instantaneous value of the PMD, can change with time. These changes may be very slow (e.g., if caused by changes of the fiber temperature) or fast (e.g., if caused by mechanical vibrations). PMD is a limiting factor for long-distance, high bit rate systems, such as long-haul wavelength division multiplexing (WDM) systems operating at bit rates of 10 Gb/s and above.

The PMD tolerance of a transmission system depends on its design parameters such as data rate, modulation format, forward error correction (FEC) and the available system margin. Also, PMD can be compensated for by the use of an optical PMD compensator (PMDC), which is placed in front of the receiver.

There are a number of problems associated with optical PMDCs. One of these is limited tracking speed (i.e., inefficient ability to follow a fast change in the polarization orientation and the PMD of the signal). The optical PMDC compensates PMD by adding to the signal the same amount of PMD but with the opposite sign as the transmission link resulting, ideally, in a zero PMD. A loss of tracking is likely to increase the PMD at the receiver over the value of PMD created on the transmission link.

If the optical receiver experiences high PMD, the bit error rate (BER) may increase beyond correcting capabilities of the forward error correction algorithms. Such events will therefore lead to bit errors which are seen by the user of the system. Because such errors often occur in bursts, they are difficult to monitor.

SUMMARY OF THE INVENTION

Various deficiencies of the prior art are addressed by the present invention of method and system for PMD monitoring and fault correlation. The bandwidth requirements for PMDCs are currently subject of discussion between transmission equipment manufacturers and their customers (i.e., the service providers). Assuming that a bandwidth requirement for the PMDC has been agreed, it will probably be the equipment manufacturers' task to demonstrate that transmission errors, if they have occurred, were due to the speed of polarization change exceeding the agreed limit, and not due to faults in the equipment provided.

In accordance with the present invention, a method is provided a receiver to identify transmission errors. An optical signal is received having polarization changes and polarization mode changes. A state of polarization changes is determined. The optical signal is converted into an electrical signal. The bit error rate (BER) of the electrical signal is determined. The state of polarization changes and the BER are analyzed thereby identifying a transmission problem.

In accordance with another aspect of the present invention, an optical receiver is provided for receiving optical signals including a polarization mode dispersion compensator (PMDC), an optical to electrical converter, a decoder, and a controller.

In accordance with another aspect of the present invention, an optical network includes a transmitter for generating and launching an optical signal, a transmission link for propagating the optical signal, and an optical receiver for determining a transmission problem using a state of polarization mode dispersion and a bit error rate of the optical signal.

BRIEF DESCRIPTION OF THE DRAWINGS

The teachings of the present invention can be readily understood by considering the following detailed description in conjunction with the accompanying drawings, in which:

FIG. 3 illustrates a table useful in understanding an embodiment of the present invention.

To facilitate understanding, identical reference numerals have been used, where possible, to designate identical elements that are common to the figures.

DETAILED DESCRIPTION OF THE INVENTION

Figure 1:
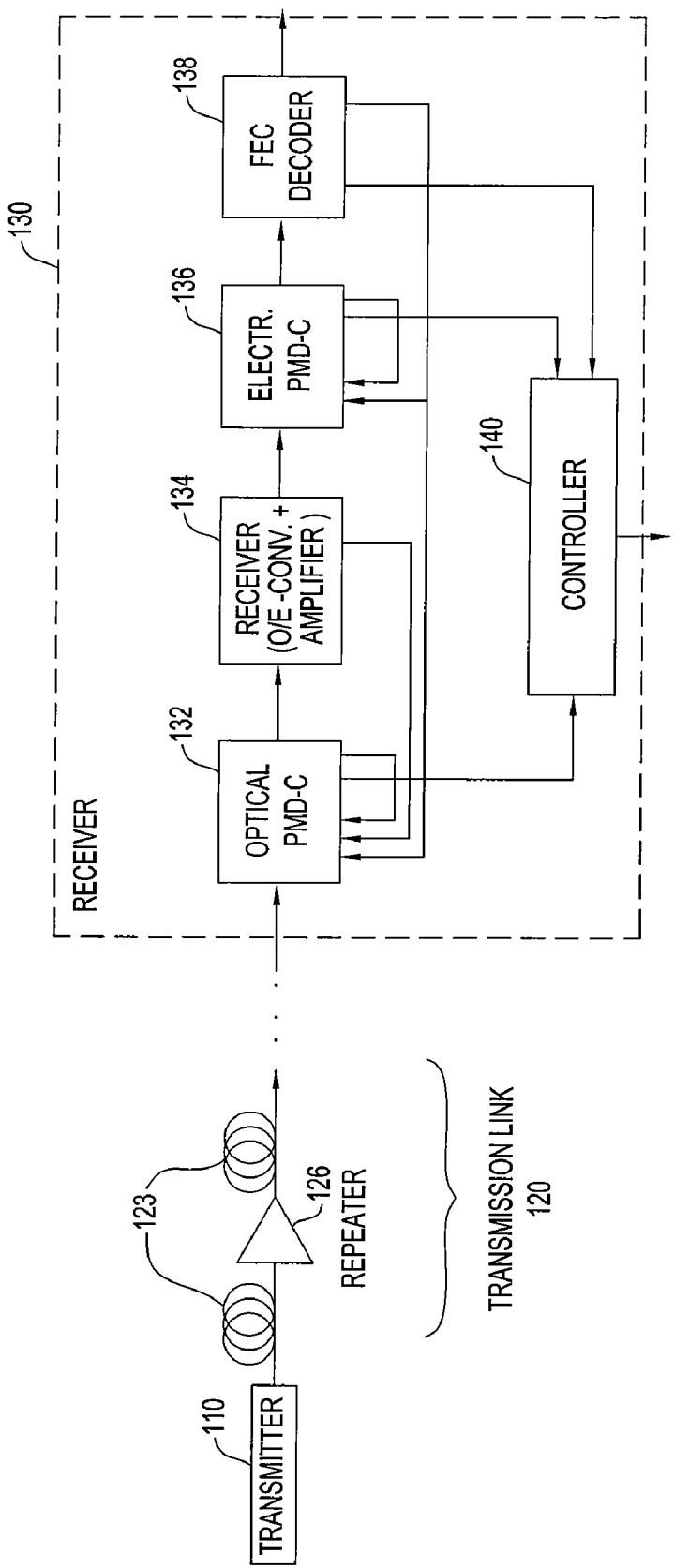
FIG. 1 depicts a high-level block diagram of an optical high-speed data transmission system according to an embodiment of the present invention.

The present invention will be primarily described within the context of polarization mode dispersion monitoring and fault correlation control of an optical high-speed data transmission system. However, it will be appreciated that other systems employing similar techniques for monitor and control will also benefit from the present invention.

The present invention utilizes optical components of a polarization mode dispersion compensator (PMDC) such that no additional optical components are necessary. This technique allows obtaining information such as the rate of change of the polarization and the polarization mode dispersion (PMD), which is used for performance monitoring and fault isolation. This information demonstrates whether transmission errors were due to polarization changes beyond the contractually agreed (e.g., per a service agreement) limits rather than due to equipment problems (i.e., fiber problem vs. equipment problem).

This invention is based in part on analysis of the dynamics of polarization of an optical signal provided to a PMDC for the determination of the cause(s) of service affecting bit errors in the transmission system.

The analysis of the dynamics of the input polarization is achieved by determining the rate of change of the input polarization states. The polarization changes, which the polarization controller affects, are determined from the control signal to the polarization controller. In one embodiment, a dither algorithm is used for the control of the PMDC. The affects of the dither algorithm on the control signal have to be taken into account. These affects can be removed by simple low pass filtering or a more complex digital signal processing algorithm applied to the function of the polarization controller.

The polarization changes resulting from the operation of the polarization controller can be related to the polarization changes of input signal by evaluating the changes in the feedback signal. In one embodiment, the feedback signal is inversely proportional to the amount of PMD present after the PMDC. In this way, a high feedback signal value corresponds to a state where the PMDC is properly compensating the PMD of the link, whereas a low feedback signal value corresponds to a state where the PMDC is not compensating the PMD of the link. In this embodiment, if the feedback signal value remains high, PMDC can be assumed to be tracking (i.e., following the polarization changes of the input signal). If the feedback signal drops significantly, the PMDC can be assumed to have lost tracking (i.e., it no longer follows changes to the input signal polarization state). If the rate of change of the polarization controller (i.e., variations in control voltages) occurs rapidly (i.e., sudden drop), the rate of change of the input signal polarization or PMD was too fast to be compensated by the PMDC.

The information obtained from the tracking behavior of the PMDC can be used for performance analysis and fault location as follows:

If the system sees unacceptably high numbers of transmission errors (e.g. such that the FEC cannot correct anymore and the errors become noticeable to customers), and the PMDC reports loss of tracking or very fast changes in polarization, the errors can attributed to PMD effects. If the PMDC did not report such fast polarization changes, but the PMDC's feedback signal was low at this time, it can be assumed that the PMD of the transmission link is beyond the compensation ability of the PMDC. If the PMDC reported no problem, the problem must be elsewhere.

This analysis can be used to verify the level of system performance agreed with customers. If a certain PMDC compensation range and bandwidth is specified by the manufacturer, the fault correlation helps to determine whether the equipment is at fault (i.e., errors occurring despite PMDC reporting tracking) or whether the speed of polarization changes or absolute PMD value on the customers' fiber is beyond the agreed PMDC performance (e.g., errors occurring at the receiver and PMDC reporting loss of tracking or statically low feedback signal). The latter cases are considered as the customer's fault (i.e., not an equipment problem for which the manufacturer has to provide a warranty.) This distinction is particularly important because the requirements for PMDC speeds are not generally agreed yet and are subject to discussions between equipment manufacturers and system operators.

FIG. 1 depicts a high-level block diagram of an optical high-speed data transmission system according to an embodiment of the present invention. The system 100 includes a transmitter 110, transmission link 120 and receiver 130.

The transmitter 110 transmits an optical signal. In one embodiment, the transmitter 110 includes a laser and a modulator for producing a modulated optical signal. In another embodiment, the transmitter signal is a multiplexed optical signal with a plurality of channels. The optical signal is propagated over the transmission link 120.

The transmission link 120 includes fiber 123 and repeater 126. The optical signal propagates along the fiber 123. The repeater 126 will condition the signal as needed. In one embodiment, compensators (not shown) are also placed along the fiber to increase the quality of the transmitted optical signal. In another embodiment, the transmission link 120 does not include the repeater 126 because it is not necessary for relatively short link. The receiver 130 receives optical signal provided by the transmission link 120.

The receiver 130 includes an optical polarization mode dispersion compensator (PMDC) 132, an optical to electrical converter and amplifier 134, an electrical PMDC 136, a forward error correction (FEC) decoder 138 and a controller 140. The optical PMDC 132 optically compensate for the dispersion due to the fiber. The optical PMDC provides performance analysis data to the controller 140. The compensated signal of the optical PMDC is propagated to the receiver 134 where it is converted to and electric signal and amplified. In another embodiment, the receiver does not include the optical PMDC 132. The electrical PMDC 136 provides compensation to the received electrical signal without previous compensation by the optical PMC 132. The electrical PMDC 136 receives the electric signal from the receiver 134 and provides compensation to the electrical signal for changes due to the fiber. The electrical PMDC 134 provides performance analysis data to the controller 140. In a further embodiment, both optical and electrical PMDC's are used. The electric signal that has been compensated is transmitted to the FEC decoder 138 where error correction is performed and the corrected signal is provided as output signal. The FEC decoder 138 also sends data performance analysis data to the controller 140. The optical PMDC 132, receiver 134, electric PMDC 136 and FEC decoder 138 (in the order named) all provide feedback control signals to at least one previous component. The controller 140 receives the performance analysis data and provides performance analysis. In one embodiment, the controller is part of receiver 130. In another embodiment, the controller 140 is part of a system controller (not shown). The controller can be located anywhere that allows the desired functions to be performed.

Figure 2:
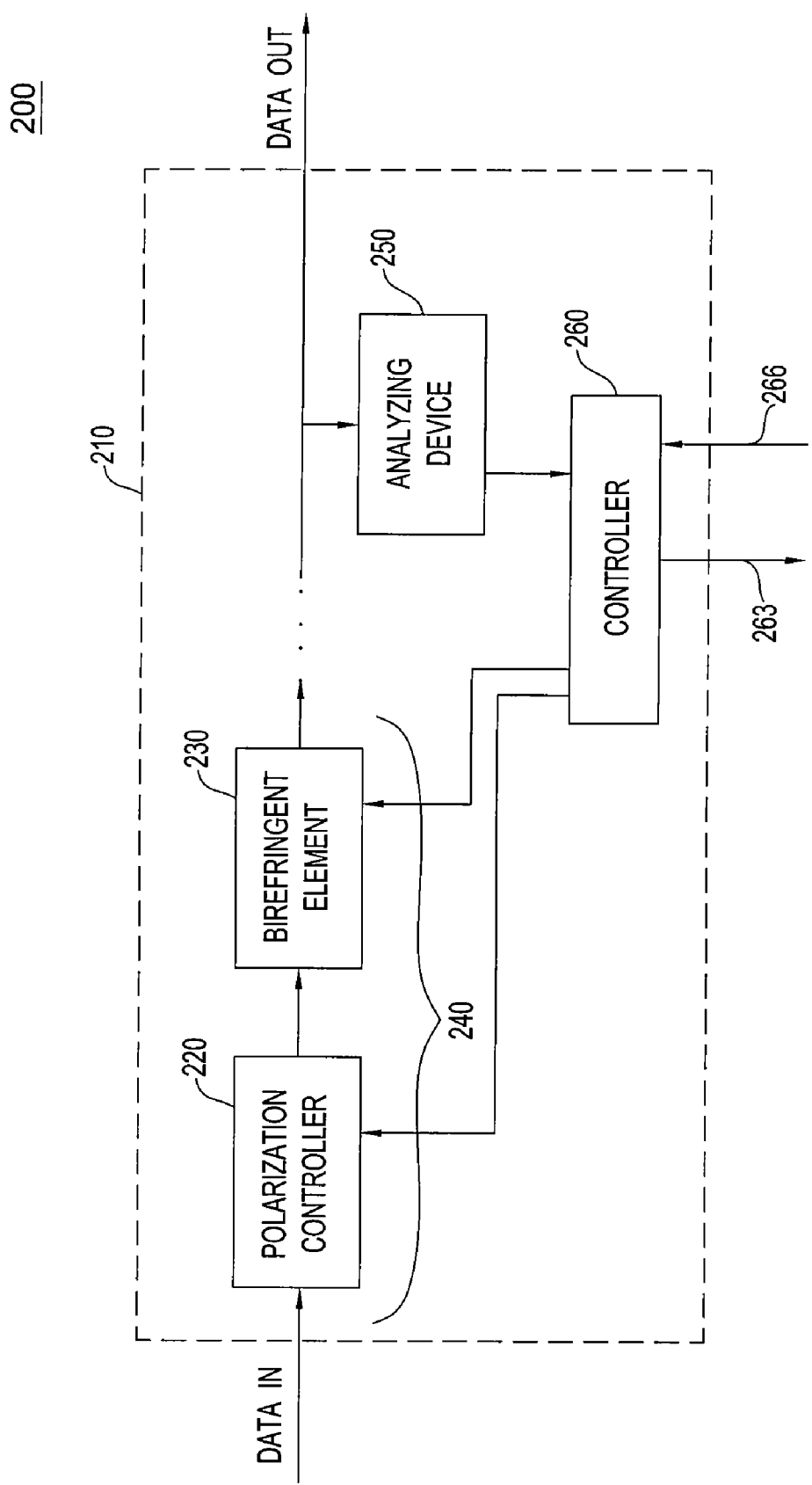
FIG. 2 depicts a high-level block diagram of an optical polarization mode dispersion controller according to an embodiment of the present invention.

FIG. 2 depicts a high-level block diagram of an optical polarization mode dispersion controller (PMDC) according to an embodiment of the present invention.

The optical PMDC 210 includes a polarization controller 220, a birefringent element 230 (together 240), an analyzing device 250, and a controller 260. The polarization controller 220 and the birefringent element 230 modify the optical signal. Together 240 they compensate for the PMD in the fiber. In one embodiment, there is one set 240 of polarization controller and birefringent element. In another embodiment, there is a plurality of sets of polarization controller and birefringent element. The analyzing device 240 analyzes the characteristics of the optical signal and provides a feedback signal to controller 260. The analyzing device provides an output signal which is a monotonic function of the PMD which remains after the signal has propagated through the PMDC, so that it can be used as a control input for a feedback control loop. There are different physical parameters of the signal which can be evaluated by the analyzing device, such as the degree of polarization or components of the electrical spectrum.

The controller 260 receives feedback signals from the analyzing device 240 as well as from other components of the system. The controller determines the state of the PMD and the bit error rate that is measured by the FEC decoder. Using that information, the controller 260 reaches a conclusion on the kind of transmission problem, if any. In one embodiment, the controller 260 of the PMDC is part of the controller of the receiver. In another embodiment the controller 260 is dedicated for use within the optical PMDC.

FIG. 3 illustrates a table useful in understanding an embodiment of the present invention.

The table 300 includes a column for the state of the PMD 310, which is transmitted within the feedback signal. It also includes a column for the bit error rate (BER) 320 that is measured by the FEC decoder. The controller 260 determines a conclusion 330 utilizing the information from those two columns and obtains the reason for the transmission problem, if any. This table is represented as a database. In another embodiment, this table is provided as hardware. Other implementation of this table in this system is possible.

In one embodiment, a high feedback signal indicates that the receiver receives a relatively clean signal having a good target value. When the state of PMD, or the feedback signal, is high 312 and the BER is low 322, the conclusion is that the system is operating within acceptable parameters. When both the state of the PMD is high 314 and the BER is high 324, the controller 260 concludes that there is a transmission problem not related to the PMD (i.e., equipment problem, power transient, etc.). When the state of PMD is low 316 and the BER is high 326, the controller 260 concludes 336 that there is a transmission problem related to polarization effects such as the PMD of the signal propagating through fiber is too high for the receiver 130 to compensate. When there is a sudden decrease in the feedback signal 318 representing the state of PMD and a sudden increase of the BER 328 measured by the FEC decoder, the controller concludes that the transmission problem 338 is related to polarization effects due to fast changes in polarization state of the signal propagating through the fiber.

Figure 4:
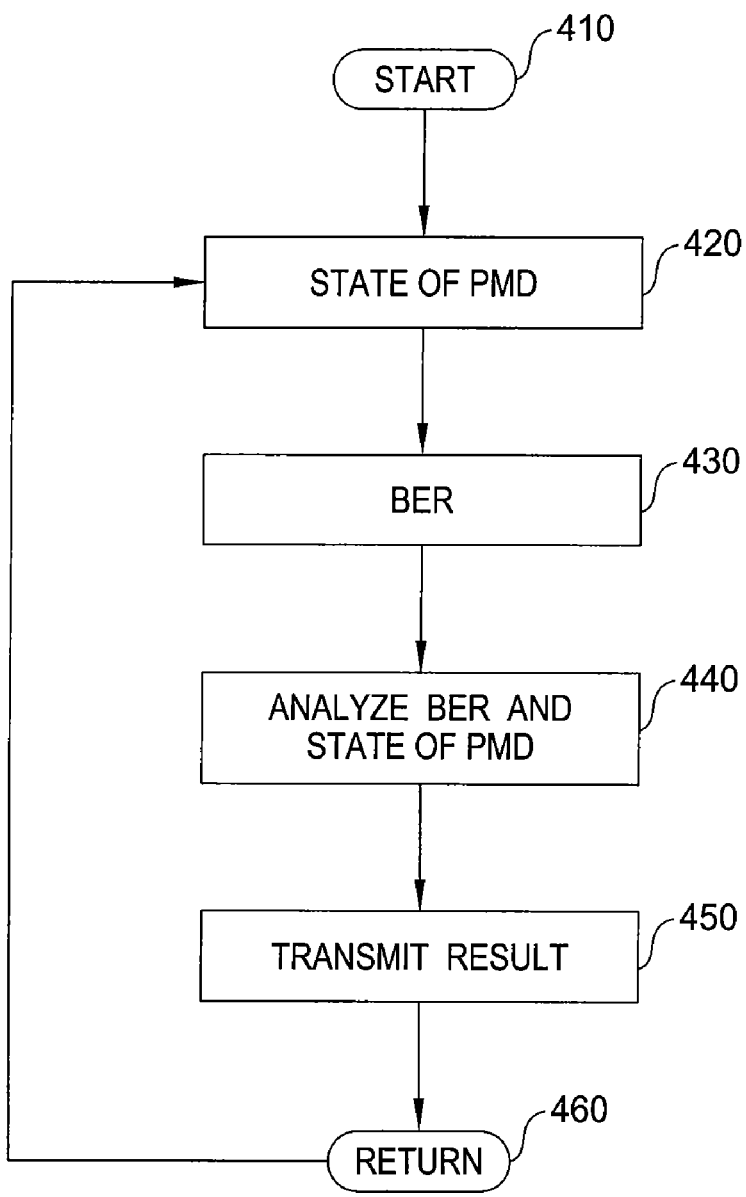
FIG. 4 depicts a flow diagram of a method according to an embodiment of the present invention.

FIG. 4 depicts a flow diagram of a method according to an embodiment of the present invention. In one embodiment, the method is accomplished in hardware such as in the polarization controller. In another embodiment, the method is accomplished in software, such as a computer or microcontroller or DSP program. Other embodiments to accomplish the present invention are also possible.

At step 410, the method 400 starts.

At step 420, the state of the PMDC is determined from the state of its feedback signal. This determination is made by analyzing the amplitude of the feedback signal and its evolution with time. This analysis provides a state of PMDC. The state of PMDC is transmitted to the other components of the system via a feedback signal. In another embodiment, the state of PMDC is transmitted to a control module.

At step 430, the BER is obtained by a decoder that performs error correction. It receives an electrical signal converted from the received optical signal. The decoder monitors the received electrical signal and keeps track of the amount of errors received as it attempts to correct them. In one embodiment, the decoder is a forward error correction decoder. Other error correcting may be used. The BER information is also transmitted as feedback signal. In another embodiment, the BER is transmitted to a controller or control module. The controller performs additional functions and determines the error rate of the received signal.

At step 440, the state of the PMDC and the BER for the received signal are analyzed. In one embodiment, the analysis is performed in a controller using a database having the information of the table 300 as described above. In other embodiments, other performance characteristic and strategies may be used to analyze the information collected at the receiver. In one embodiment, a high feedback signal indicates the receiver receives a relatively clean signal having a good target value. When the state of PMDC's feedback signal is high 312 and the BER is low 322, the conclusion is that the system is operating within acceptable parameters. When both the state of the PMDC'S feedback signal is high 314 and the BER is high 324, the controller 260 concludes that there is a transmission problem not related to the PMD (i.e., equipment problem, power transient, etc.). When the state of PMDC's feedback signal is low 316 and the BER is high 326, the controller 260 concludes 336 that there is a transmission problem related to polarization effects such as the PMD of the signal propagating through fiber is too high for the receiver 130 to compensate. When there is a sudden decrease in the feedback signal 318 representing the state of PMDC's feedback signal and a sudden increase of the BER 328 measured by the FEC decoder, the controller concludes that the transmission problem 338 is related to polarization effects due to fast changes in polarization state of the signal propagating through the fiber.

At step 450, the conclusion reached by the analysis step of 440 is transmitted to higher-level controllers (not shown) for further processing if necessary.

At step 460, the algorithm will run continuously by returning to step 420. In this manner, monitoring over long periods of time is possible.

Although various embodiments that incorporate the teachings of the present invention have been shown and described in detail herein, those skilled in the art can readily devise many other varied embodiments that still incorporate these teachings.

What is claimed is:

1. A method for a receiver to determine whether a transmission problem associated with a received optical signal is related to polarization effects of an optical fiber propagating the optical signal, comprising:
   determining a level and rate of change of a polarization mode dispersion compensator (PMDC) feedback signal;
   converting the received optical signal into an electrical signal;
   determining a bit error rate (BER) of the electrical signal; and
   analyzing the level of the PMDC feedback signal, the rate of change of the PMDC feedback signal, and the BER to determine thereby the transmission problem.

2. The method of claim 1, wherein the polarization comprises polarization mode dispersion (PMD).

3. The method of claim 2, further comprising: compensating for the PMD using the PMDC.

4. The method of claim 1, wherein the BER is determined by a forward error correction decoder.

5. The method of claim 1, wherein a dither algorithm is used for control of the PMDC, wherein effects of the dither algorithm are accounted for in the PMDC feedback signal.

6. The method of claim 1, further comprising:
   transmitting an indication of the transmission problem toward at least one controller.

7. The method of claim 1, wherein the level of the PMDC feedback signal and the rate of change of the PMDC feedback signal are based on a voltage of the PMDC feedback signal.

8. The method of claim 1, wherein a high level of the PMDC feedback signal and a low BER indicate normal operation of the receiver.

9. The method of claim 1, wherein a high level of the PMDC feedback signal and a high BER indicate that the transmission problem is not related to polarization mode dispersion.

10. The method of claim 1, wherein a low level of the PMDC feedback signal and a high BER indicate that the transmission problem is related to polarization effects in which polarization mode dispersion is too great for the receiver to compensate.

11. The method of claim 1, wherein a sudden decrease in the level of the PMDC feedback signal and a sudden increase of the BER indicate that the transmission problem is related to polarization effects in which a speed of change in polarization state of the optical signal is too fast for the receiver.

12. An optical receiver for receiving an optical signal and determining whether a transmission problem associated with the optical signal is related to polarization effects of an optical fiber propagating the optical signal, comprising:

a polarization mode dispersion compensator (PMDC) configured to compensate the received optical signal;

an optical to electrical converter configured to convert the compensated optical signal into an electrical signal;

a decoder configured to determine a bit error rate (BER) of the electrical signal; and a controller configured to:

receive a level and rate of change of a PMDC feedback signal of the PMDC and the BER; and analyze the level of the PMDC feedback signal, the rate of change of the PMDC feedback signal, and the BER to determine thereby the transmission problem.

13. The optical receiver of claim 12, wherein the PMDC comprises at least one of an optical PMDC and an electrical PMDC.

14. The optical receiver of claim 12, wherein the level of the PMDC feedback signal and the rate of change of the PMDC feedback signal are based on a voltage of the PMDC feedback signal.

15. The optical receiver of claim 12, wherein a high level of the PMDC feedback signal and a low BER indicate normal operation of the receiver.

16. The optical receiver of claim 12, wherein a high level of the PMDC feedback signal and a high BER indicate that the transmission problem is not related to polarization mode dispersion.

17. The optical receiver of claim 12, wherein a low level of the PMDC feedback signal and a high BER indicate that the transmission problem is related to polarization effects in which polarization mode dispersion is too great for the receiver to compensate.

18. The optical receiver of claim 12, wherein a sudden decrease in the level of the PMDC feedback signal and a sudden increase of the BER indicate that the transmission problem is related to polarization effects in which a speed of change in polarization state of the optical signal is too fast for the receiver.

19. An optical network, comprising:

a transmitter configured to transmit an optical signal;

a transmission link configured to propagate the optical signal; and an optical receiver configured to receive the optical signal and determine whether a transmission problem associated with the optical signal is related to polarization effects of the transmission link propagating the optical signal, the optical receiver configured to:

determine a level and rate of change of a polarization mode dispersion compensator (PMDC) feedback signal;

convert the received optical signal into an electrical signal;

determine a bit error rate (BER) of the electrical signal; and analyze the level of the PMDC feedback signal, the rate of change of the PMDC feedback signal, and the BER to determine thereby the transmission problem.

20. The optical network of claim 19, wherein the transmission link comprises a repeater.

* * * * *